United States Patent
Kobayashi

(10) Patent No.: US 11,902,013 B2
(45) Date of Patent: Feb. 13, 2024

(54) SIGNAL PROCESSING CIRCUIT AND SIGNAL PROCESSING SYSTEM

(71) Applicant: SONY SEMICONDUCTOR SOLUTIONS CORPORATION, Kanagawa (JP)

(72) Inventor: Kenichi Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 323 days.

(21) Appl. No.: 17/250,416

(22) PCT Filed: Jul. 22, 2019

(86) PCT No.: PCT/JP2019/028724
§ 371 (c)(1),
(2) Date: Jan. 19, 2021

(87) PCT Pub. No.: WO2020/022293
PCT Pub. Date: Jan. 30, 2020

(65) Prior Publication Data
US 2021/0288732 A1    Sep. 16, 2021

(30) Foreign Application Priority Data

Jul. 27, 2018   (JP) .................. 2018-141104

(51) Int. Cl.
*H04H 20/42*   (2008.01)
(52) U.S. Cl.
CPC ....... *H04H 20/426* (2013.01); *H04H 2201/10* (2013.01)

(58) Field of Classification Search
CPC .. H04H 20/426; H04H 2201/10; H04H 60/13; H04H 60/41; H04B 1/16; H04N 21/435; H04N 21/438; H04N 21/442
See application file for complete search history.

(56) References Cited

U.S. PATENT DOCUMENTS

| | | | |
|---|---|---|---|
| 2010/0297958 A1* | 11/2010 | Murakami | ............... H04N 5/38 455/77 |
| 2010/0309317 A1* | 12/2010 | Wu | ....................... H04W 16/14 348/180 |
| 2017/0033959 A1 | 2/2017 | Kim et al. | |

FOREIGN PATENT DOCUMENTS

| | | |
|---|---|---|
| CA | 2946773 A1 | 1/2017 |
| CN | 106664282 A | 5/2017 |
| EP | 3331207 A1 | 6/2018 |
| JP | 2006-101304 A | 4/2006 |
| JP | 2017-531340 A | 10/2017 |

(Continued)

OTHER PUBLICATIONS

International Search Report and Written Opinion of PCT Application No. PCT/JP2019/028724, dated Sep. 10, 2019, 07 pages of ISRWO.

(Continued)

*Primary Examiner* — Ankur Jain
(74) *Attorney, Agent, or Firm* — CHIP LAW GROUP

(57) ABSTRACT

Provided is a signal processing circuit including an information detection unit (204) that detects signal bandwidth information indicating a bandwidth of a channel signal in a broadcast signal received by a receiving circuit (100) that receives the broadcast signal, and the signal bandwidth information is used for execution of a channel scan.

11 Claims, 9 Drawing Sheets

(56) References Cited

FOREIGN PATENT DOCUMENTS

KR  10-2017-0023784 A   3/2017
WO  2017/018607 A1   2/2017

OTHER PUBLICATIONS

"ATSC Standard: A/321, System Discovery and Signaling", Advanced Television Systems Committee, Mar. 23, 2016, 28 pages.

* cited by examiner

SIGNAL PROCESSING CIRCUIT AND SIGNAL PROCESSING SYSTEM

CROSS REFERENCE TO RELATED APPLICATIONS

This application is a U.S. National Phase of International Patent Application No. PCT/JP2019/028724 filed on Jul. 22, 2019, which claims priority benefit of Japanese Patent Application No. JP 2018-141104 filed in the Japan Patent Office on Jul. 27, 2018. Each of the above-referenced applications is hereby incorporated herein by reference in its entirety.

TECHNICAL FIELD

The present disclosure relates to a signal processing circuit and a signal processing system.

BACKGROUND ART

In recent years, various technologies regarding digital TV broadcasting have been developed. For example, a standardized technology described in NPL 1 is known.

CITATION LIST

Patent Literature

[NPL 1] ATSC Standard: A/321, System Discovery and Signaling (https://www.atsc.org/wp-content/uploads/2016/03/A321-2016-System-Discovery-and-Signaling.pdf)

SUMMARY

Technical Problem

When receiving a broadcast signal related to a digital TV, first, a receiver sets a frequency band of a signal of a channel included in the broadcast signal. In this case, the receiver checks whether the channel signal can be received with a predetermined bandwidth.

However, in the existing devices, the checking is performed for each of candidate bandwidths. Therefore, the time for checking whether it is possible to receive a signal is required for each bandwidth.

The present disclosure proposes a signal processing circuit and a signal processing system capable of shortening the time required for a channel scan.

Solution to Problem

According to the present disclosure, provided is a signal processing circuit including: an information detection unit that detects signal bandwidth information indicating a bandwidth of a channel signal in a broadcast signal received by a receiving circuit that receives the broadcast signal, wherein the signal bandwidth information is used for execution of a channel scan.

According to the present disclosure, provided is a signal processing system including: a signal processing circuit; and a processor, wherein the signal processing circuit includes an information detection unit that detects signal bandwidth information indicating a bandwidth of a channel signal in a broadcast signal received by a receiving circuit that receives the broadcast signal, and the signal bandwidth information is used for the processor to execute a channel scan.

Advantageous Effects of Invention

According to the present disclosure, it is possible to shorten the time required for a channel scan.

Note that the effects described above are not necessarily limitative. With or in the place of the above effects, there may be achieved any one of the effects described in this specification or other effects that may be recognized from this specification.

DESCRIPTION OF EMBODIMENTS

Figure 1:
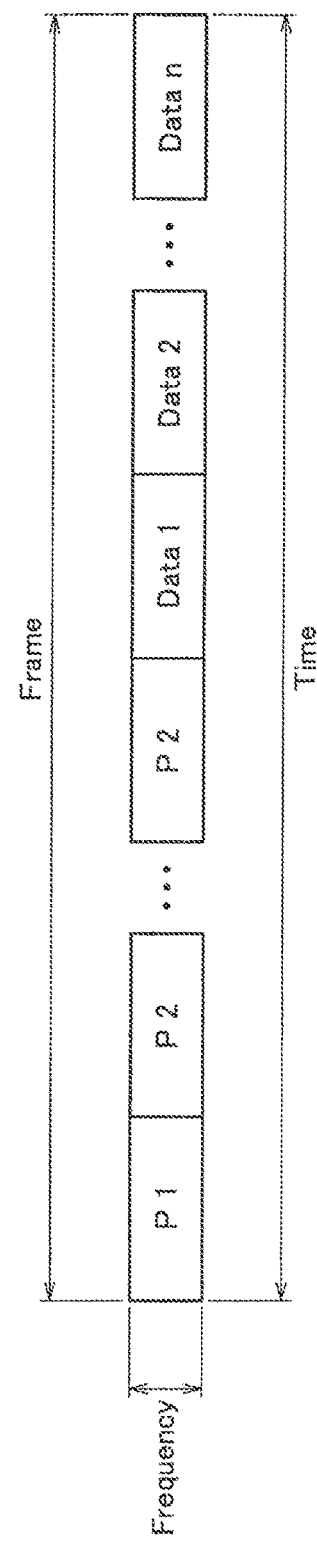
FIG. 1 is a diagram illustrating an example of a frame configuration of a broadcast signal.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Background and overview
2. First Embodiment
2-1. Configuration example of signal processing system 10
2-2. Configuration example and processing example of receiving circuit 100
2-3. Configuration example and processing example of demodulating circuit 200
2-4. Flow of processing
3. Second Embodiment
4. Conclusion

1. BACKGROUND AND OVERVIEW

First, a background and an overview of the present invention will be described. For a receiver to receive a broadcast signal of a television, it is necessary that the bands of respective channels included in the broadcast signal are set. However, since the band is different from one country or region to another, the receiver executes a channel scan to check the band of a signal that can be received. Here, a channel scan refers to checking whether the channel signal can be received in a predetermined band and setting a frequency band of the signal of which the reception is normally completed to the receiver.

FIG. 1 is a diagram illustrating an example of a frame configuration of a broadcast signal. In FIG. 1, the frame configuration of DVB-T2 (Digital Video Broadcasting-Terrestrial) which is one of the standards of terrestrial digital television broadcasting is illustrated as an example. Here, preambles P1 and P2 are illustrated. Moreover, Data 1 to n are payloads. For example, in this standard, information on a frequency bandwidth of a channel is not included in the preambles P1 and P2. Therefore, even when a receiver receives the preambles P1 and P2, the receiver cannot check the bandwidths of the respective channel signals. Therefore, the receiver has to check whether the channel signal can be received with each of candidate bandwidths during a channel scan.

Figure 2:
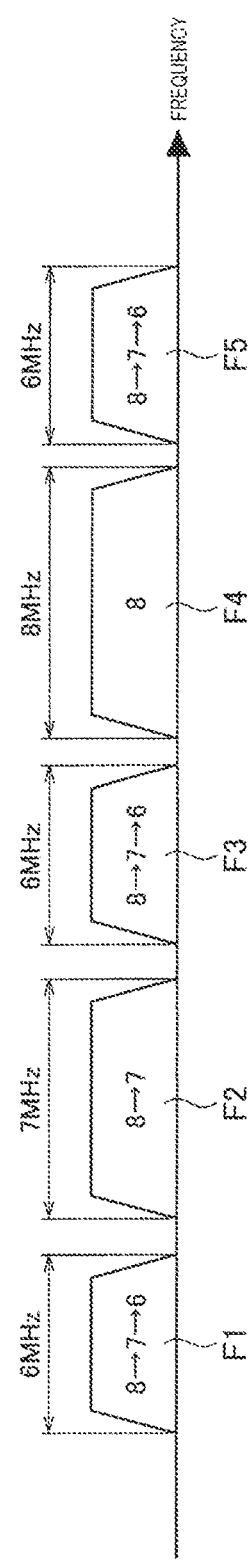
FIG. 2 is a diagram for describing an overview of a channel scan.

FIG. 2 is a diagram for describing an overview of a channel scan. In FIG. 2, the signals F1 to F5 of respective channels are illustrated. In FIG. 2, the frequency bandwidths of the channel signals F1 to F5 are set respectively.

This will be described in detail below. First, a receiver attempts to receive the signal F1. Subsequently, the receiver executes reception processing of the channel signal F1 with a bandwidth of 8 MHz and confirms that the channel signal F1 cannot be received normally.

Subsequently, the receiver executes reception processing of the channel signal F1 with a bandwidth of 7 MHz and confirms that the channel signal F1 cannot be received normally. Subsequently, the receiver executes reception processing of the channel signal F1 with a bandwidth of 6 MHz and confirms that the channel signal F1 can be received normally.

When the receiver executes the above-described operations, it is confirmed that the bandwidth of the channel signal F1 is 6 MHz. The receiver executes similarly operations on the channel signals F2 to F5 and confirms that the bandwidths thereof are 7 MHz, 6 MHz, 8 MHz, and 6 MHz, respectively. The checking of whether a channel signal can be received with the candidate bandwidth is executed at predetermined frequency intervals. For example, after checking with the frequency of the channel signal F1 is completed, the receiver checks whether the channel signal F1 can be received with a frequency that is a predetermined frequency higher than the frequency of the channel signal. Therefore, in the case of the example of FIG. 2, after checking of the bandwidth of the channel signal F1 is completed, the receiver checks the bandwidth of the channel signal F2.

Figure 3:
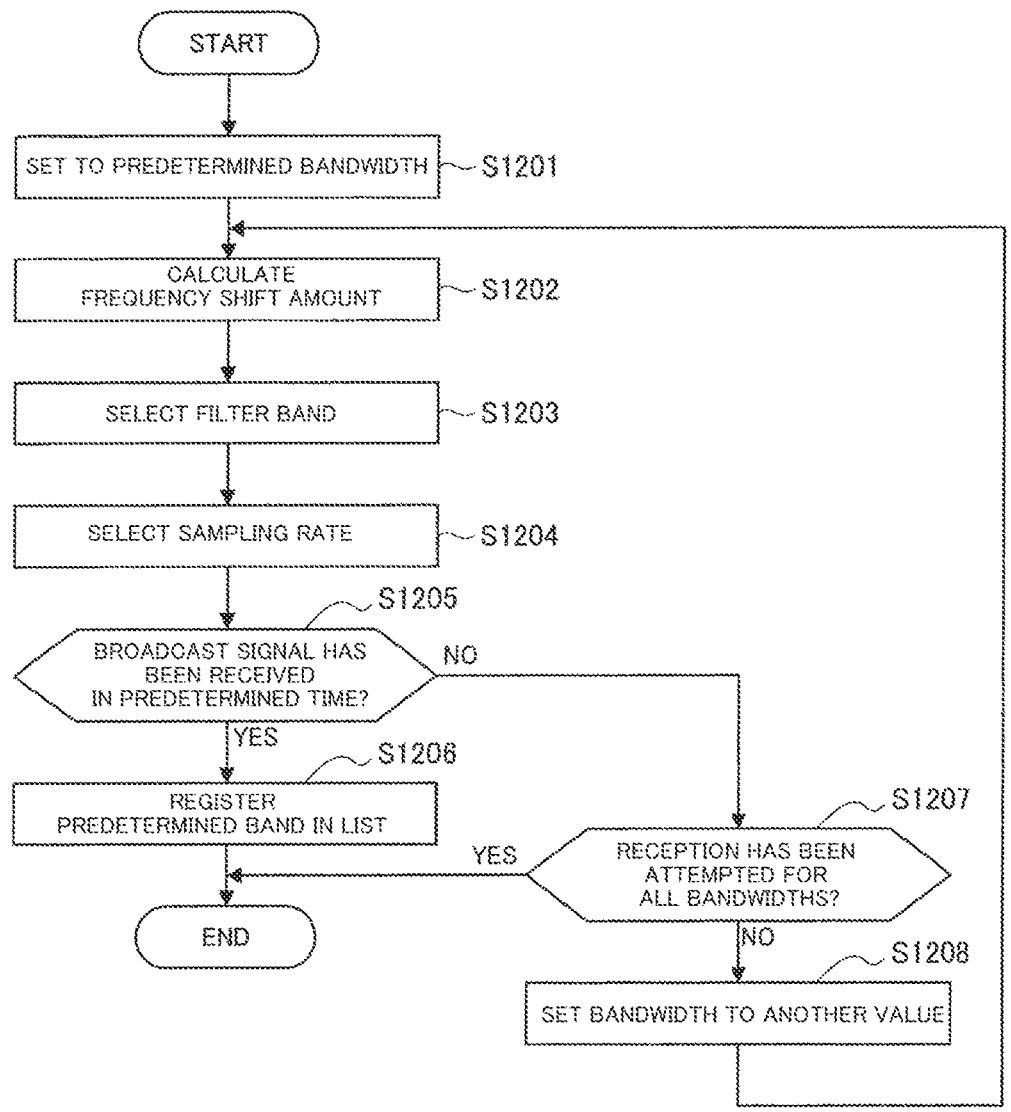
FIG. 3 is a diagram for describing the flow of processing of a channel scan.

Next, the flow of the processing of a channel scan will be described. FIG. 3 is a diagram for describing the flow of processing of a channel scan. Referring to FIG. 3, first, the receiver sets a bandwidth of a target channel signal for which reception is attempted as an initial setting (S1201). Subsequently, the receiver calculates a frequency shift amount on the basis of the setting (S1202). Moreover, the receiver selects an unnecessary frequency band to be removed from a broadcast signal on the basis of the setting (S1203). Furthermore, the receiver selects a sampling rate of the broadcast signal after conversion to a baseband signal on the basis of the setting (S1204).

Subsequently, the receiver determines whether the reception of the channel signal can be completed normally in a predetermined time (S1205). When the reception of the channel signal by the receiver is completed normally in the predetermined time (S1205: YES), the bands of the signals of which the reception is completed is saved in a recording medium as a list. When the reception of the channel signal by the receiver is not completed normally in the predetermined time (S1205: NO), it is determined whether it is checked for all candidate bandwidths whether the channel signal can be received (S1207). When it has not been checked for all candidate bandwidths whether the channel signal can be received (S1207: NO), the receiver sets the bandwidth of the target channel signal of which the reception is attempted to another value (S1208) and the flow returns to step S1202. When it has been checked for all candidate bandwidths whether the channel signal can be received (S1207: YES), the operation ends.

In this way, the receiver can set the frequency band of a channel signal by checking whether the channel signal can be received with the candidate bandwidth. However, the time for checking which respective signals can be received with the candidate bandwidth is required for respective bandwidths.

The technical concept according to an embodiment of the present disclosure is conceived by paying attention to the above-mentioned points, and a channel scan can be executed using signal bandwidth information indicating a bandwidth of a channel signal. Due to this function, the time required for a channel scan can be shortened.

Figure 4:
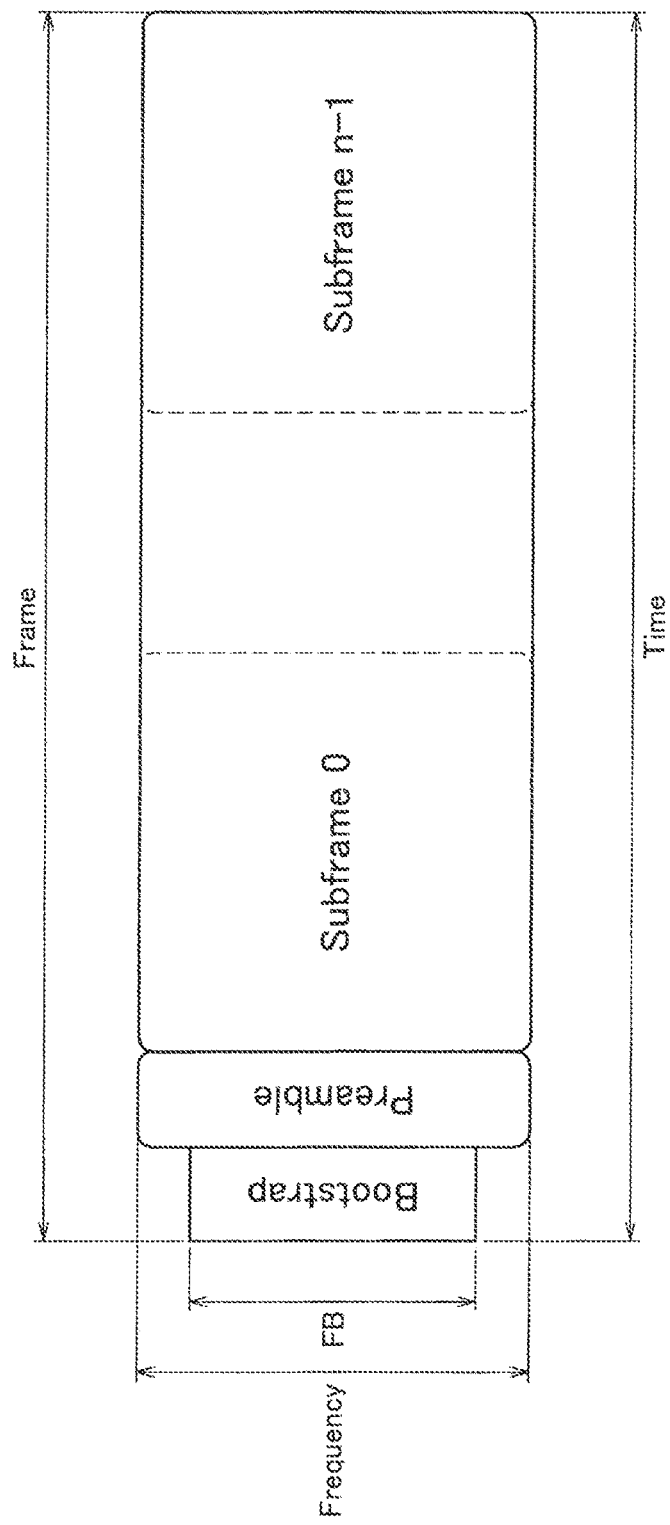
FIG. 4 is a diagram for describing an example of a frame configuration of a broadcast signal according to the present embodiment.

FIG. 4 is a diagram for describing an example of a frame configuration of a broadcast signal according to the present embodiment. In FIG. 4, an example of a frame configuration corresponding to the ATSC (Advanced Television Systems Committee) 3.0 standard is illustrated as an example. As illustrated in FIG. 2, in a frame configuration of the ATSC 3.0 standard, a bit string called bootstrap is present at a beginning portion ahead of a preamble. A signal processing circuit according to the present embodiment can detect signal bandwidth information included in a bootstrap. Here, the signal bandwidth information refers to information indicating a bandwidth of a channel signal. Moreover, the signal bandwidth information may be included in a predetermined frequency band.

In the case of the ATSC 3.0 standard, the receiver detects 2-bit data called {system_bandwidth} included in a region called a bootstrap. The {system_bandwidth} includes the signal bandwidth information indicating the bandwidth of a channel signal in which the detected bootstrap is included. The bandwidth of the signal is any one of 6 MHz, 7 MHz, and 8 MHz in the case of the ATSC 3.0 standard.

Here, the bandwidth of the bootstrap is always a fixed value of 4.5 MHz. Therefore, the receiver can confirm the bandwidth of the channel signal by initially setting 4.5 MHz which is the bandwidth of the bit string as a bandwidth during a channel scan.

In the {system_bandwidth} which is the 2-bit data, {00} indicates 6 MHz, {01} indicates 7 MHz, {10} indicates 8 MHz, and {11} indicates a bandwidth larger than 8 MHz.

In this manner, it is necessary to check whether reception is completed for respective candidate bandwidths by initially acquiring the bandwidth of a signal during a channel scan.

The signal processing circuit according to the present embodiment can detect the signal bandwidth information and execute a channel scan on the basis of the signal bandwidth information. According to this function, the time required for a channel scan can be shortened.

A signal processing circuit according to the present embodiment and a signal processing system according to the present embodiment will be described mainly for an example in which the signal processing system according to the present embodiment receives a broadcast signal corresponding to the ATSC 3.0 standard.

Note that the signal processing according to the present embodiment is not limited to the ATSC 3.0 standard but can be applied to an arbitrary standard which has the signal bandwidth information.

2. FIRST EMBODIMENT (2-1. Configuration Example of Signal Processing System 10)

Figure 5:
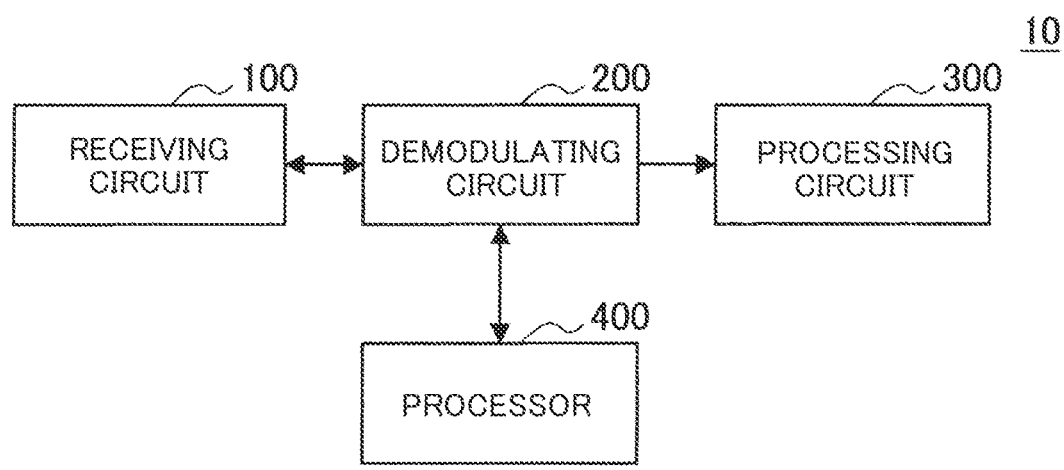
FIG. 5 is a block diagram illustrating an example of a configuration of a signal processing system 10 according to a first embodiment.

FIG. 5 is a block diagram illustrating an example of the configuration of the signal processing system 10 according to the present embodiment. The signal processing system 10 includes, for example, a receiving circuit 100, a demodulating circuit 200, a processing circuit 300, and a processor 400.

The receiving circuit 100 is a circuit that has a function of receiving a broadcast signal. Moreover, the receiving circuit 100 extracts a signal having a preset frequency from the received broadcast signal and executes analog-to-digital conversion on the signal.

The demodulating circuit 200 is a signal processing circuit that has a function of demodulating the broadcast signal received by the receiving circuit 100. Moreover, the demodulating circuit 200 detects signal bandwidth information in the broadcast signal. Furthermore, the demodulating circuit 200 specifies the bandwidth of a channel signal.

The processing circuit 300 is a circuit that has a function of processing the broadcast signal demodulated by the demodulating circuit 200. For example, the processing circuit 300 converts the broadcast signal converted to a digital signal by the demodulating circuit 200 to an analog signal. Moreover, the processing on the demodulated broadcast signal is arbitrary processing that can be performed on the demodulated broadcast signal, and examples thereof include display control processing of displaying an image on a display screen of a display device and audio output processing of outputting audio from an audio output device.

The processor 400 is an external processor that has a function of executing a channel scan on the basis of the signal bandwidth information received from the demodulating circuit 200. Here, the processor 400 may generate scan information on the basis of the signal bandwidth information and transmit the scan information to the demodulating circuit 200. Here, the scan information refers to information that designates a target bandwidth for which a channel scan is executed.

The processor 400 may execute a channel scan at predetermined frequency intervals.

Due to the configuration illustrated in FIG. 5, the signal processing system 10 can receive a broadcast signal, demodulate the broadcast signal, and process the demodulated broadcast signal. Moreover, the signal processing system 10 can detect signal bandwidth information and execute a channel scan on the basis of the signal bandwidth information.

The configuration of the signal processing system 10 according to the present embodiment is not limited to the example illustrated in FIG. 5.

The signal processing system according to the present embodiment may include some or all of a ROM (Read Only Memory; not illustrated), a RAM (Random Access Memory; not illustrated), a recording medium (not illustrated), a display device (not illustrated), an audio output device (not illustrated), an operating device (not illustrated), and a communication device (not illustrated). Moreover, the signal processing system according to the present embodiment may be configured according to an application example of a processing device according to the present embodiment to be described later.

The processor 400 is configured, for example, as an arithmetic circuit such as an MPU (Micro Processing Unit).

The ROM (not illustrated) stores control data such as arithmetic parameters and programs used by the processor 400. The RAM (not illustrated) temporarily stores programs and the like executed by the processor 400.

The recording medium (not illustrated) is a storage unit included in the signal processing system according to the present embodiment, and for example, stores various pieces of data such as data related to the signal processing of the demodulating circuit 200, data related to the signal processing of the processing circuit 300, and various applications. Here, an example of the recording medium (not illustrated) is a nonvolatile memory such as a flash memory. In the signal processing system 10 illustrated in FIG. 5, one or both of the demodulating circuit 200 and the processing circuit 300 may include a recording medium (not illustrated), for example. Moreover, the signal processing system 10 according to the present embodiment may not include a recording medium (not illustrated), and various kinds of data such as the data related to the signal processing according to the present embodiment may be stored in an external storage medium of the signal processing system 10 according to the present embodiment.

The display device (not illustrated) displays various images such as, for example, images related to the results of a channel scan on a display screen. Examples of the display device (not illustrated) include a liquid crystal display, an organic EL display, and the like. Moreover, the display device may be a device that has both a display function and an operating function such as, for example, a touch panel.

The audio output device (not illustrated) outputs various kinds of audio such as, for example, audio (including music) indicating the content of a channel scan and audio (including music) indicated by a broadcast signal. An example of the audio output device (not illustrated) is a speaker.

The operating device (not illustrated) is a device that can be operated by the user of the signal processing system 10 according to the present embodiment. Examples of the operating device (not illustrated) include a button, a direction key, and a rotary selector such as a jog dial, or combinations thereof.

The communication device (not illustrated) is a communication unit included in the signal processing system according to the present embodiment and plays the role of performing communication with an external device in a radio or wired manner. Examples of the communication device (not illustrated) include a communication antenna and an RF (Radio Frequency) circuit (radio communication), an IEEE 802.15.1 port and a transceiving circuit (radio communication), an IEEE 802.11 port and a transceiving circuit (radio communication), or a LAN (Local Area Network) terminal and a transceiving circuit (wired communication).

(2-2. Configuration Example and Example of Processing of Receiving Circuit 100)

Figure 6:
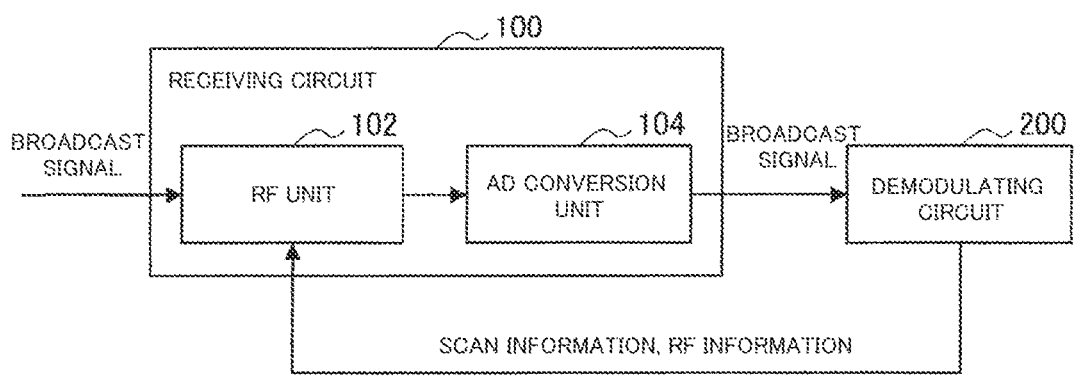
FIG. 6 is a block diagram illustrating a functional configuration example of a receiving circuit 100 according to the first embodiment.

Next, a configuration example and an example of processing of the receiving circuit 100 according to the present embodiment will be described. FIG. 6 is a block diagram illustrating a functional configuration example of the receiving circuit 100 according to the present embodiment. Referring to FIG. 6, the receiving circuit 100 according to the present embodiment includes an RF unit 102 and an AD conversion unit 104.

(RF Unit 102)

The RF unit 102 according to the present embodiment has a function of receiving a broadcast signal and removing unnecessary frequency components from the received broadcast signal. Moreover, the RF unit 102 receives scan information and RF information from a register 206 to be described later. Moreover, the RF unit 102 calculates a frequency shift amount using the RF information. Here, the RF information is used for the RF unit 102 to calculate a frequency shift amount when an IFBB conversion unit 202 of the demodulating circuit 200 to be described later converts the received broadcast signal to a baseband signal. The RF unit 102 transmits the calculated frequency shift amount as well as the broadcast signal to the AD conversion unit 104 to be described later.

The RF unit 102 includes an antenna for receiving the broadcast signal. The antenna is configured as an antenna having an arbitrary configuration such as a dipole antenna, a monopole antenna, a chip antenna, or a pattern antenna and receives radio waves on which a broadcast signal is carried.

The RF unit 102 includes a filter that removes unnecessary frequency components from the received broadcast signal. The band of frequencies to be removed is selected on the basis of the scan information. The filter is configured as an arbitrary filter such as, for example, a low-pass filter or a band-pass filter. Moreover, the RF unit 102 includes an amplifier. The amplifier is configured as an arbitrary amplifier such as an LNA (Low Noise Amplifier) and amplifies a signal transmitted from the filter.

(AD Conversion Unit 104)

The AD conversion unit 104 according to the present embodiment has a function of converting the broadcast signal which is an analog signal transmitted from the RF unit 102 to a digital signal.

The configuration of the receiving circuit 100 is not limited to the above-described example. For example, the receiving circuit 100 may have an arbitrary configuration as long as it can receive a broadcast signal transmitted via radio waves.

(2-3. Configuration Example and Example of Processing of Demodulating Circuit 200)

Figure 7:
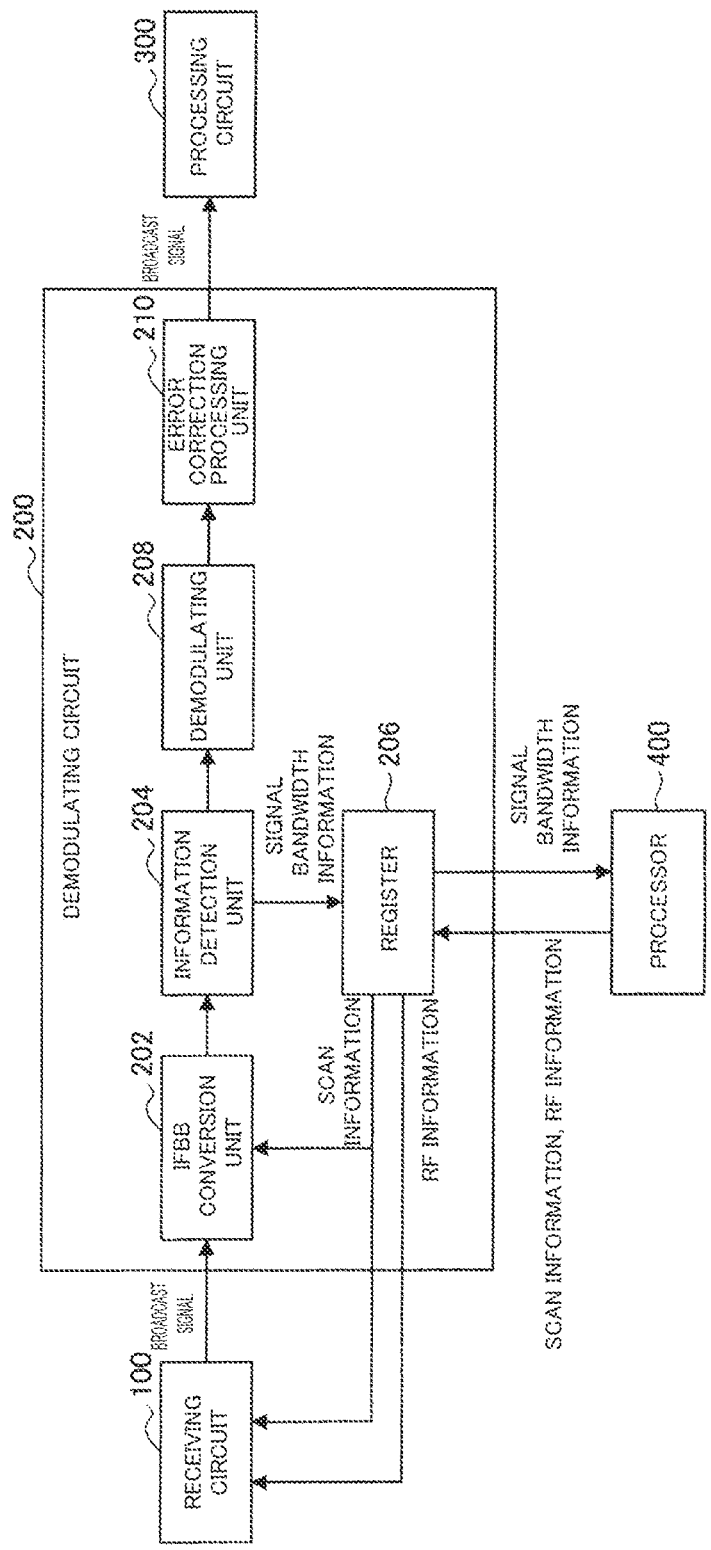
FIG. 7 is a block diagram illustrating a functional configuration example of a demodulating circuit 200 according to the first embodiment.

Next, a functional configuration example of the demodulating circuit 200 according to the present embodiment will be described. FIG. 7 is a block diagram illustrating a functional configuration example of the demodulating circuit 200 according to the present embodiment. Referring to FIG. 7, the demodulating circuit 200 according to the present embodiment includes an IFBB conversion unit 202, an information detection unit 204, a register 206, a demodulating unit 208, and an error correction processing unit 210.

(IFBB Conversion Unit 202)

The IFBB conversion unit 202 according to the present embodiment has a function of converting the broadcast signal received from the receiving circuit 100 to an IF (Intermediate Frequency) signal and further converting the broadcast signal converted to the IF signal to a BB (Base-Band) signal. The IFBB conversion unit 202 may convert the broadcast signal received from the receiving circuit 100 directly to the BB signal.

The IFBB conversion unit 202 includes a mixer. A signal transmitted from the amplifier and a signal having a predetermined frequency generated by an oscillator (not illustrated) or the like are input to the mixer, and the mixer converts the signal transmitted from the amplifier to an IF signal.

(Information Detection Unit 204)

The information detection unit 204 according to the present embodiment has a function of detecting the signal bandwidth information indicating the bandwidth of a channel signal in the broadcast signal. Moreover, the information detection unit 204 has a function of transmitting the detected signal bandwidth information to the processor 400 via the register 206 to be described later.

As described above, the information detection unit 204 detects 2-bit data called {system_bandwidth} included in the region called a bootstrap. The information detection unit 204 transmits the detected {system_bandwidth} which is the signal bandwidth information to the processor 400 via the register 206 to be described later.

(Register 206)

The register 206 according to the present embodiment has a function of storing information on a channel scan. Moreover, the register 206 receives the signal bandwidth information from the information detection unit 204 and transmits the signal bandwidth information to the processor 400. For example, in the case of the ATSC 3.0 standard, the register 206 receives the {system_bandwidth} data from the information detection unit 204 and transmits the data to the processor 400.

The register 206 receives the scan information and the RF information from the processor 400. Transmission and reception of various pieces of information between the register 206 and the processor 400 may be performed by an interface such as, for example, I2C (I-squared-C).

The register 206 has a function of transmitting the scan information and the RF information to the receiving circuit 100 and the scan information to the IFBB conversion unit 202.

(Demodulating Unit 208)

The demodulating unit 208 according to the present embodiment has a function of demodulating the broadcast signal transmitted from the information detection unit 204. Specifically, the demodulating unit 208 has a function of executing a fast Fourier transform process and an equalization process using an equalizer, for example.

(Error Correction Processing Unit 210)

The error correction processing unit 210 according to the present embodiment has a function of performing error correction on the broadcast signal demodulated by the demodulating unit 208. Moreover, the error correction processing unit 210 may execute interleaving or data stream processing. Furthermore, after executing predetermined processing such as error correction on the broadcast signal, the error correction processing unit 210 transmits the broadcast signal to the processing circuit 300.

Hereinabove, the functional configuration example of the demodulating circuit 200 has been described. The function of the demodulating circuit 200 is not limited to the above-described example. For example, the demodulating circuit 200 may not have the components other than the information detection unit 204. Moreover, the components of the demodulating circuit 200 other than the information detection unit 204 may be included in a separate circuit (for example, the receiving circuit 100 or the processing circuit 300).

The demodulating circuit 200 may include some or all of the components of the receiving circuit 100. That is, in the signal processing system according to the present embodiment, the demodulating circuit 200 illustrated in FIG. 7 may further include some or all of the functions of the receiving circuit 100 illustrated in FIG. 7. When the demodulating circuit 200 further has some or all of the functions of the receiving circuit 100, some or all of the components of the receiving circuit 100 included in the demodulating circuit 200 play the role of a receiving unit of the demodulating circuit 200.

An example of the demodulating circuit 200 is an IC (Integrated Circuit) chip which includes one or two or more processors and in which various circuits for implementing the function of the demodulating circuit 200 are integrated.

Naturally, the demodulating circuit 200 may not be implemented in the form of an IC chip.

(2-4. Flow of Processing)

Figure 8:
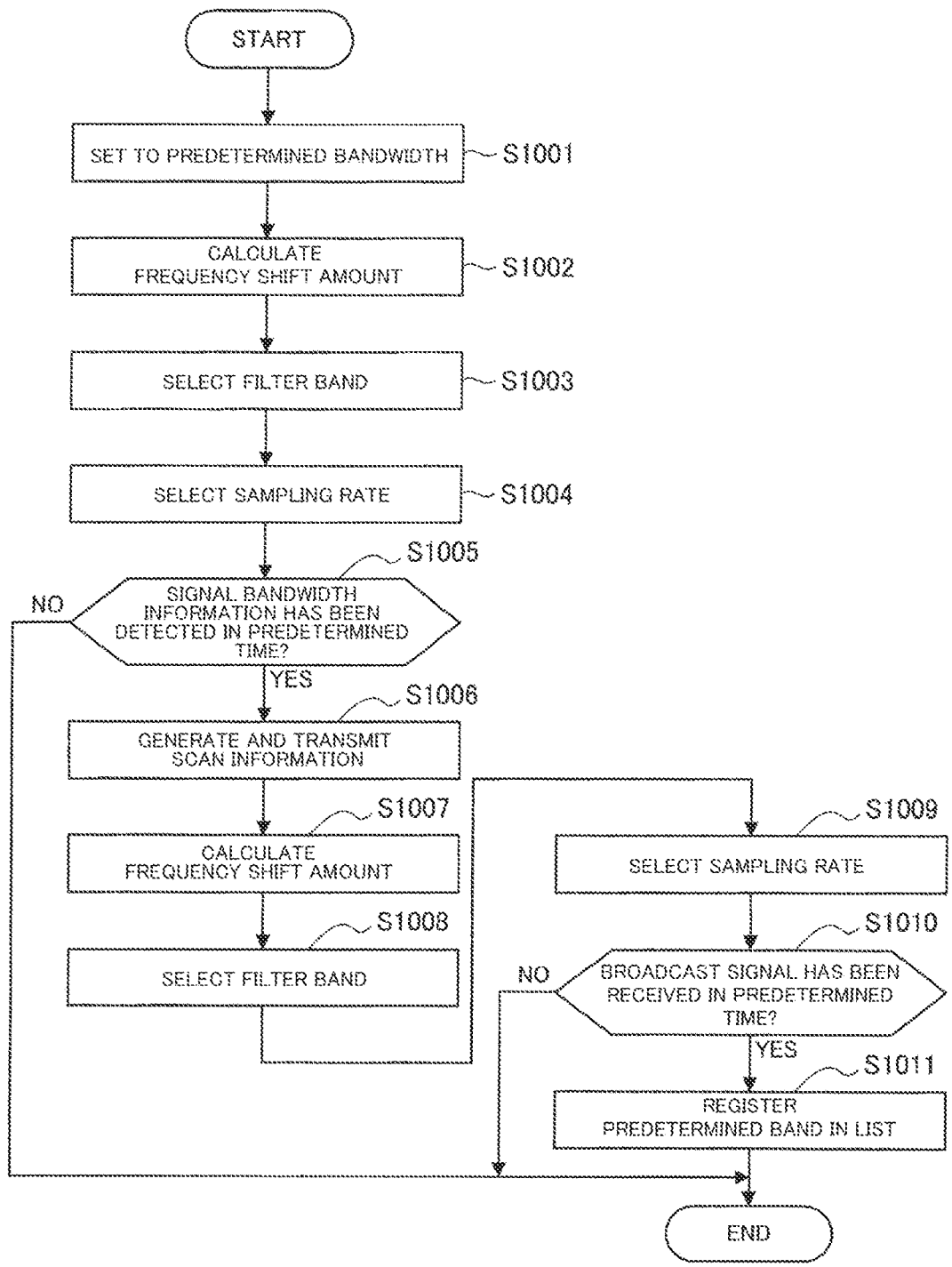
FIG. 8 is a diagram for describing an example of the flow of processing related to a channel scan using signal bandwidth information by the signal processing system 10.

Hereinafter, the flow of processing related to a channel scan using the signal bandwidth information by the signal processing system 10 will be described. FIG. 8 is a diagram for describing an example of the flow of processing related to a channel scan using the signal bandwidth information by the signal processing system 10.

Referring to FIG. 8, first, the register 206 transmits scan information to the RF unit 102 and the IFBB conversion unit 202 as initial setting so as to set a bandwidth in which the signal bandwidth information of the channel signal that the signal processing system 10 attempts to receive can be detected and transmits RF information to the RF unit 102 (S1001). Subsequently, the RF unit 102 receives the RF information and calculates a frequency shift amount on the basis of the RF information (S1002). Moreover, the RF unit 102 receives the scan information and selects unnecessary frequency bands to be removed from the broadcast signal on the basis of the scan information (S1003). On the other hand, the IFBB conversion unit 202 receives the scan information and selects a sampling rate of the broadcast signal after conversion to a baseband signal on the basis of the scan information (S1004).

Subsequently, the information detection unit 204 determines whether the signal bandwidth information is detected in a predetermined time (S1005). When the information detection unit 204 has not detected the signal bandwidth information in the predetermined time (S1005: NO), a channel scan is executed with the bandwidth set in advance in the register 206 or the processing ends. On the other hand, when the information detection unit 204 detects the signal bandwidth information in the predetermined time (S1005: YES), the information detection unit 204 transmits the signal bandwidth information to the processor 400 via the register 206, and the processor 400 generates scan information on the basis of the signal bandwidth information and transmits the scan information to the register 206 (S1006).

Subsequently, the RF unit 102 receives the RF information and calculates the frequency shift amount again on the basis of the RF information (S1007). Subsequently, the RF unit 102 receives the scan information generated by the processor 400 and selects unnecessary frequency bands to be removed from the broadcast signal on the basis of the scan information (S1008). On the other hand, the IFBB conversion unit 202 receives the scan information generated by the processor 400 and selects a sampling rate of the broadcast signal after conversion to the baseband signal on the basis of the scan information (S1009). Subsequently, it is determined whether the demodulating circuit 200 has normally received the channel signal in the predetermined time (S1010). When the demodulating circuit 200 has normally received the channel signal in the predetermined time (S1010: YES), the bands of the signals of which the reception has been completed are stored in a recording medium (not illustrated) as a list. When the demodulating circuit 200 has not normally received the channel signal in the predetermined time (S1010: NO), the processing ends.

The processing other than the processing (steps S1002, S1003, S1007, and S1008) of the RF unit 102 may be executed by hardware or external firmware.

3. SECOND EMBODIMENT

Hereinabove, the first embodiment according to the present disclosure has been described. Next, a second embodiment according to the present disclosure will be described. Basically, the content overlapping the description of the first embodiment will be omitted and the difference from the first embodiment will be described.

Figure 9:
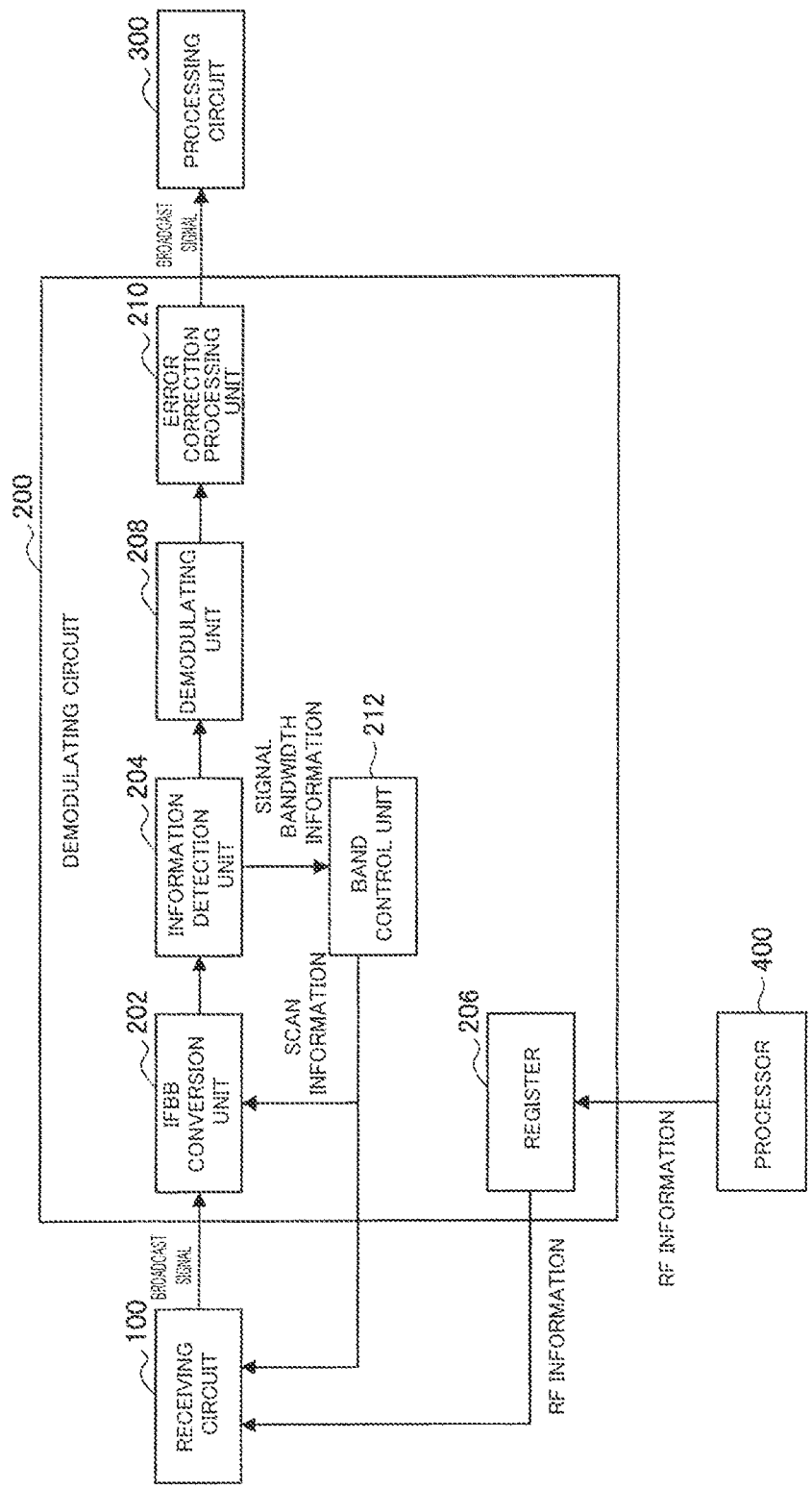
FIG. 9 is a block diagram illustrating a functional configuration example of the demodulating circuit 200 according to a second embodiment.

FIG. 9 is a block diagram illustrating a functional configuration example of the demodulating circuit 200 according to the present embodiment. In FIG. 9, a band control unit 212 is further provided.

The band control unit 212 according to the present embodiment corresponds to the processor 400 according to the first embodiment. Specifically, the band control unit 212 according to the present embodiment has a function of executing a channel scan on the basis of a bandwidth of a channel signal. Specifically, the band control unit 212 generates scan information on the basis of the signal bandwidth information received from the information detection unit 204 and transmits the scan information to the RF unit 102 and the IFBB conversion unit 202 of the receiving circuit.

Processing related to a channel scan is performed as follows. When signal bandwidth information is detected from the broadcast signal, the information detection unit 204 transmits the signal bandwidth information to the band control unit 212. The band control unit 212 generates scan information on the basis of the signal bandwidth information and transmits the generated scan information to the receiving circuit 100 and the IFBB conversion unit 202.

When the information detection unit 204 has not detected the signal bandwidth information, the band control unit 212 executes a channel scan with the bandwidth set in advance in the band control unit 212. Specifically, when the information detection unit 204 has not detected the signal bandwidth information in the channel signal, the band control unit 212 generates scan information on the basis of the bandwidth set in advance in the band control unit 212 and transmits the generated scan information to the receiving circuit 100 and the IFBB conversion unit 202.

As described above, since the demodulating circuit 200 according to the present embodiment includes the band control unit 212, it is not necessary to transmit and receive the signal bandwidth information and the scan information via the register 206 and the processor 400. Therefore, the time required for a channel scan can be shortened further.

4. CONCLUSION

As described above, the signal processing circuit and the signal processing system can confirm the bandwidth of the channel signal using the signal bandwidth information included in the broadcast signal. According to this function, the time required for a channel scan can be shortened.

While the preferred embodiments of the present disclosure have been described above with reference to the accompanying drawings, the technical scope of the present disclosure is not limited to the above examples. A person skilled in the art may find various alterations and modifications within the scope of the technical idea described in the claims, and it should be understood that they will naturally come under the technical scope of the present disclosure.

For example, the steps illustrated in the flowcharts may not necessarily be executed chronically in the order described in the flowcharts. That is, the steps may be processed in the order different from the order described in the flowcharts, or may also be processed in parallel.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Note that, the following configurations also fall within the technical scope of the present disclosure.

(1)

A signal processing circuit including:

an information detection unit that detects signal bandwidth information indicating a bandwidth of a channel signal in a broadcast signal received by a receiving circuit that receives the broadcast signal, wherein the signal bandwidth information is used for execution of a channel scan.

(2)

The signal processing circuit according to (1), wherein the information detection unit detects the signal bandwidth information from a predetermined frequency band of the broadcast signal.

(3)

The signal processing circuit according to (1) or (2), wherein the channel scan is executed by an external processor on the basis of the bandwidth of the channel signal.

(4)

The signal processing circuit according to any one of (1) to (3), wherein the channel scan is executed at predetermined frequency intervals.

(5)

The signal processing circuit according to (1) or (2), further including:

a band control unit that executes a channel scan on the basis of the bandwidth of the channel signal indicated by the signal bandwidth information.

(6)

The signal processing circuit according to (5), wherein the band control unit transmits scan information that designates a target bandwidth in which the channel scan is executed to the receiving circuit on the basis of the signal bandwidth information.

(7)

The signal processing circuit according to (5) or (6), wherein the band control unit executes a channel scan with a preset bandwidth when the signal bandwidth information is not detected in the broadcast signal.

(8)

The signal processing circuit according to any one of (1) to (7), wherein the information detection unit detects the signal bandwidth information from a bootstrap corresponding to the ATSC (Advanced Television Systems Committed) 3.0 standard.

(9)

A signal processing system including:

a signal processing circuit; and a processor, wherein the signal processing circuit includes an information detection unit that detects signal bandwidth information indicating a bandwidth of a channel signal in a broadcast signal received by a receiving circuit that receives the broadcast signal, and the signal bandwidth information is used for the processor to execute a channel scan.

(10)

The signal processing system according to (9), wherein the processor transmits scan information that designates a target bandwidth in which the channel scan is executed to the receiving circuit on the basis of the signal bandwidth information.

(11)

The signal processing system according to (10), wherein the processor transmits the scan information to the receiving circuit via a register.

REFERENCE SIGNS LIST

10 Signal processing system
100 Receiving circuit
102 RF unit
104 AD conversion unit
200 Demodulating circuit
202 IFBB conversion unit
204 Information detection unit
206 Register
208 Demodulating unit
210 Error correction processing unit
212 Band control unit
300 Processing circuit
400 Processor

The invention claimed is:

1. A signal processing circuit, comprising: an information detection unit configured to detect signal bandwidth information in a broadcast signal received by a receiving circuit, wherein the received broadcast signal includes the signal bandwidth information at a beginning portion of a frame of the broadcast signal, the signal bandwidth information indicates a bandwidth of a channel signal, the signal bandwidth information is used for execution of a channel scan, the information detection unit is further configured to detect a bit string present at the beginning portion of the frame prior to a preamble of the frame, and the bit string represents the bandwidth of the channel signal.

2. The signal processing circuit according to claim 1, wherein the information detection unit is further configured to detect the signal bandwidth information from a determined frequency band of the broadcast signal.

3. The signal processing circuit according to claim 1, wherein the channel scan is executed by an external processor based on the bandwidth of the channel signal.

4. The signal processing circuit according to claim 1, wherein the channel scan is executed at determined frequency intervals.

5. The signal processing circuit according to claim 1, further comprising a band control unit configured to execute the channel scan based on the bandwidth of the channel signal indicated by the signal bandwidth information.

6. The signal processing circuit according to claim 5, wherein
the band control unit is further configured to transmit scan information to the receiving circuit based on the signal bandwidth information, and
the scan information designates a target bandwidth in which the channel scan is executed.

7. The signal processing circuit according to claim 5, wherein the band control unit is further configured to execute the channel scan with a preset bandwidth in a case where the signal bandwidth information is not detected in the broadcast signal.

8. The signal processing circuit according to claim 1, wherein the information detection unit is further configured to detect the signal bandwidth information from a bootstrap corresponding to Advanced Television Systems Committed (ATSC) 3.0 standard.

9. A signal processing system, comprising: a receiving circuit configured to receive a broadcast signal, wherein the received broadcast signal includes signal bandwidth information that indicates a bandwidth of a channel signal; a signal processing circuit, wherein the signal processing circuit includes an information detection unit configured to detect the signal bandwidth information at a beginning portion of a frame of the broadcast signal; and a processor configured to execute a channel scan based on the signal bandwidth information,
wherein the information detection unit is further configured to detect a bit string present at the beginning portion of the frame prior to a preamble of the frame, and the bit string represents the bandwidth of the channel signal.

10. The signal processing system according to claim 9, wherein
the processor is further configured to transmit scan information to the receiving circuit based on the signal bandwidth information, and
the scan information designates a target bandwidth in which the channel scan is executed.

11. The signal processing system according to claim 10, wherein the processor is further configured to transmit the scan information to the receiving circuit via a register.

* * * * *